(12) United States Patent
Choi

(10) Patent No.: US 7,119,872 B2
(45) Date of Patent: Oct. 10, 2006

(54) OPEN GATE LINE REPAIR IN AN LCD

(75) Inventor: Woo Hyuk Choi, Daegu-si (KR)

(73) Assignee: LG Philips LCD Co., Ltd., Seoul (KR)

( * ) Notice: Subject to any disclaimer, the term of this patent is extended or adjusted under 35 U.S.C. 154(b) by 90 days.

(21) Appl. No.: 10/701,323

(22) Filed: Nov. 4, 2003

(65) Prior Publication Data
US 2004/0125332 A1    Jul. 1, 2004

(30) Foreign Application Priority Data
Dec. 30, 2002    (KR) ............... 10-2002-0086565

(51) Int. Cl.
*G02F 1/13* (2006.01)
(52) U.S. Cl. .................................... 349/192
(58) Field of Classification Search ............... 349/192
See application file for complete search history.

(56) References Cited

U.S. PATENT DOCUMENTS

| | | | |
|---|---|---|---|
| 5,600,460 A * | 2/1997 | Yamamoto et al. | 349/54 |
| 6,646,694 B1 * | 11/2003 | Lee | 349/55 |
| 6,664,568 B1 * | 12/2003 | Lai | 349/192 |
| 6,717,648 B1 * | 4/2004 | Tsukao | 349/192 |
| 2005/0078235 A1 * | 4/2005 | Ozaki et al. | 349/55 |

* cited by examiner

*Primary Examiner*—James A. Dudek
(74) *Attorney, Agent, or Firm*—Brinks Hofer Gilson & Lione

(57) ABSTRACT

An LCD repair method repairs gate opens in a gate line where the gate line intersects with a data line or where the gate open exists at a position where it is not overlapped by a single pixel electrode. The method includes connecting a pixel electrode overlapping a portion of the opened gate line to the gate line, and forming a metal pattern to electrically connect two adjacent pixel electrodes.

18 Claims, 7 Drawing Sheets

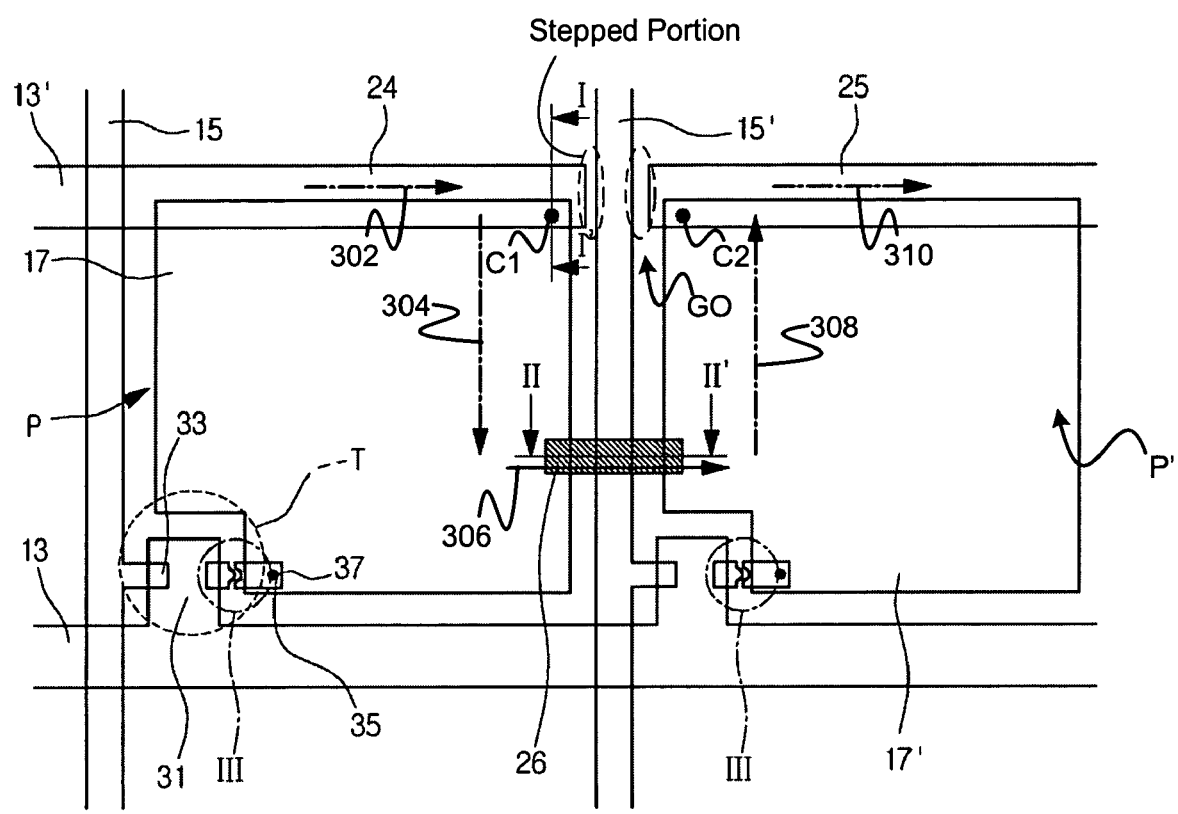

OPEN GATE LINE REPAIR IN AN LCD

BACKGROUND OF THE INVENTION

1. Field of the Invention

The present invention relates to liquid crystal displays, and more particularly, to repairing an open gate line in an LCD.

2. Description of the Related Art

Generally, a liquid crystal display (LCD) utilizes optical anisotropy and polarization properties of liquid crystals. The liquid crystals also have directionality properties imparted by their slender and long structure. An electric field applied to the liquid crystal can control the direction of molecular arrangement in the liquid crystal.

Accordingly, adjusting the direction of molecular arrangement modulates light polarized due to the optical anisotropy to represent an image information.

Such liquid crystals are classified according to their electrical characteristics as either a positive liquid crystal or a negative liquid crystal. A liquid crystal molecule whose permittivity anisotropy is positive has a major axis arranged in parallel with the direction of the applied electric field. On the other hand, a liquid crystal molecule whose permittivity anisotropy is negative has a major axis arranged perpendicular to the direction of the applied electric field.

Today, an active matrix LCD, in which thin film transistors coupled to pixel electrodes coupled are arranged in a matrix form, is widely used because it has an excellent resolution and is responsive enough for displaying rapidly changing images. A liquid crystal display panel is often constructed as explained below with regard to FIG. 1, which shows an exploded perspective view of a LCD.

Referring to FIG. 1, the LCD 11 includes an upper substrate 5 and a lower substrate 22, and the liquid crystal 14. The liquid crystal 14 is disposed between the upper substrate 5 and the lower substrate 22. The upper substrate 5 is provided with a color filter that includes a black matrix 6, a sub color filter 8, and a transparent common electrode 18 formed on the color filter 7. The lower substrate 22 supports circuitry for individual pixel areas P, including a pixel electrode 17 formed in each pixel area P, a thin film transistor T serving as a switching element, a data line 15, and a gate line 13.

The lower substrate 22 is also called an array substrate, and the switching thin film transistors T are arranged in a matrix form. The thin film transistors T are generally located proximate to where the gate line 13 and the data line 15 intersect. The areas bounded by the intersection of the gate lines 13 and the data lines 15 are the pixel areas P.

In operation, the gate line 13 applies a control voltage pulse that drives a gate electrode of the thin film transistor T, and the data line 15 applies a signal voltage for driving a source electrode of the thin film transistor T. When the signal voltage is applied to the source electrode and the control voltage pulse drives the gate electrode, the signal voltage is applied through the transistor to the activate the pixel. When the signal voltages applied to the remaining source electrodes are lower than the liquid crystal driving voltage, the pixels connected to the remaining source electrodes remain inactive, and only a single pixel activates.

In order to independently drive each pixel, gate lines and data lines are arranged in a matrix form over an overall display area. As noted above, the gate lines and the data lines drive the thin film transistors to activate or deactivate selected pixels.

However, defects may impair the operation of the circuitry formed on the array substrate during manufacturing. The defects are generally classified as a dot defect, a line defect, or a display spot defect according to impact that the defect has on the operation of the pixels. The dot defect is caused due to a thin film transistor failure and a pixel electrode failure, and the line defect is caused by a breakdown of the thin film transistor due to a gate or data line open circuit or short circuit, caused, for example, by static electricity.

The defects are increasingly problematic and important as the display area of the LCD increase. Particularly, even a single line defect is considered a fatal defect. The defective LCD is considered valueless because a whole row or column of pixels is rendered inoperable. In other words, the LCD is not considered a saleable product and, as a result, the resources spent to produce the defective LCD are wasted.

In the past, a line defect in the form of an open circuit in a gate line has been repaired as will be described next. In particular, FIGS. 2A, 2B, and 2C are plan views schematically illustrating a partial portion of an array substrate of a LCD, and show the prior repair technique for an open circuit defect in a gate line.

Referring to FIG. 2A, the gate lines 13 and 13' and the data lines 15 and 15' intersect to define a pixel area P. A neighboring pixel area P' is also shown, and the electrodes 17 and 17' are disposed within the pixel areas P and P' respectively. A thin film transistor T that includes a gate electrode 31, a source electrode 33 and a drain electrode 35 is formed proximate to the intersection area of the gate lines 13 and 13' and the data lines 15 and 15'.

In addition, the pixel electrode 17 is electrically connected to the drain electrode 35 of the thin film transistor T via a contact hole 37 provided within the pixel area P. A predetermined portion of each pixel electrode 17 and 17' is overlapped with the gate line 13'. For example, a portion of the pixel electrodes 17 and 17' extend over the gate line 13', and thereby form individual capacitors with capacitance Cst.

Here, the source electrode 33 and the drain electrode 35 are formed spaced apart under the gate electrode 31 by a predetermined interval, and an active channel (not shown) formed from a semiconductor layer (not shown) for the transistor T is thereby exposed in the interval.

When a scanning pulse is applied to the gate electrode 31 of the thin film transistor T, the voltage on the gate electrode 31 increases and the thin film transistor T is turned on. At this time, a liquid crystal driving voltage is applied to the pixel electrode 17 from the data line 15 through the source electrode 33 and the drain electrode 35 of the thin film transistor T, so that a pixel capacitance is charged. The pixel capacitance is a sum of a liquid crystal capacitance Clc and the storage capacitor capacitance Cst.

In such an array substrate, as shown in FIGS. 2B and 2C, a gate open (GO) may occur due to impurities or other factors occurring during a manufacturing process. Here, the gate open (GO) represents a break or open circuit at or over a predetermined portion of the gate line 13'.

FIG. 2B illustrates a case in which the gate line 13' has a gate open (GO) contained within the pixel area P, and more particularly contained within the extent of the pixel electrode 17. On the other hand, FIG. 2C illustrates a case in which the gate line 13' has a gate open (GO) at a stepped portion that occurs where the gate line 13' intersects with the data line 15'.

Referring to FIG. 2B, when the gate line 13' has a gate open (GO) within the pixel area P, a laser welding process may be employed to repair the gate line 13'. Note that the gate line 13' includes a first portion 20 and a second portion 21 on opposite sides on the gate open (GO). To repair the gate open (GO), the first portion 20 is connected to the pixel electrode 17 (where the first portion 20 overlaps the pixel electrode 17), and the second portion 21 is also connected to the pixel electrode 17 (where the second portion 21 overlaps the pixel electrode 17). The connection point formed by the laser is labeled "C" in FIG. 2B.

By doing so, the opened gate line 13' incorporates the pixel electrode 17 to bypass the gate open (GO).

In this case, the corresponding pixel electrode 17 does not play operate as a conventional pixel electrode. As a result, the associated pixel is defective and has the appearance of a one pixel spot on the LCD. Nevertheless, a one pixel spot is within the guidelines for acceptance as a good LCD panel, and may therefore by sold to generate revenue.

Note, however, that this technique cannot be applied to bypass all gate open (GO) manifestations. For example, as shown in FIG. 2C, a gate open (GO) may occur in the gate line 13' at the stepped portion where the gate line 13' intersects with the data line 15'. In other words, since the gate line portions 24 and 25 (disposed at first and second sides of the opened gate line 13') overlap different pixel electrodes 17 and 17', forming connection points C between the gate line portions 24 and 25 and the underlying pixel electrodes 17 and 17' does not fix the gate open (GO) condition.

Since the technique described above cannot repair the gate open (GO) defect shown in FIG. 2C, the corresponding LCD panel must be discarded, thereby reducing the manufacture yield of the LCD panel, and wasting valuable product manufacturing resources.

Thus, a need has long existed for addressing the gate open (GO) defects noted above, and related problems previously experienced.

SUMMARY OF THE INVENTION

Accordingly, the present invention is directed to a repair method, and a repaired LCD, that substantially obviates one or more problems due to limitations and disadvantages of the related art. Additional advantages and features of the invention will be set forth in the description which follows and will become apparent to those having ordinary skill in the art upon examination of the following description or may be learned by practicing the invention.

In one implementation, the repair method repairs a gate open (GO) condition in a gate line in an LCD. The LCD, may include, for example, multiple gate lines arranged in a substrate, multiple data lines intersected with the gate lines to delineate multiple pixel areas, and thin film transistors disposed proximate to where the gate lines and the data lines intersect. The transistors may serve as switching elements, and pixel electrodes are disposed in the pixel areas. The method includes connecting the opened gate line with a first pixel electrode overlapping a portion of the opened gate line, and forming a metal pattern using, for example, a laser chemical vapor deposition to electrically connect two pixel electrodes that are adjacent to each other.

In another implementation, the repair method also repairs a gate open (GO) condition in an LCD, for example when the gate line is open at a stepped portion intersecting a data line. As before, the LCD includes multiple gate lines arranged in a substrate, multiple data lines intersected perpendicular to the gate lines to delineate multiple pixel areas, thin film transistors disposed proximate to where the gate lines and the data lines intersect, and pixel electrodes disposed in the pixel areas. The method includes connecting a first portion of the opened gate line and a first pixel electrode that overlaps the first portion of the opened gate line, connecting a second portion of the opened gate line and a second pixel electrode that overlaps the second portion of the opened gate line, and electrically connecting the first and second pixel electrodes.

It is to be understood that both the foregoing general description and the following detailed description of the present invention are exemplary and explanatory, rather than limiting.

BRIEF DESCRIPTION OF THE DRAWINGS

FIG. 3 illustrates a repair method for a gate open (GO) in a gate line.

DETAILED DESCRIPTION OF THE PREFERRED EMBODIMENTS

Figure 1:
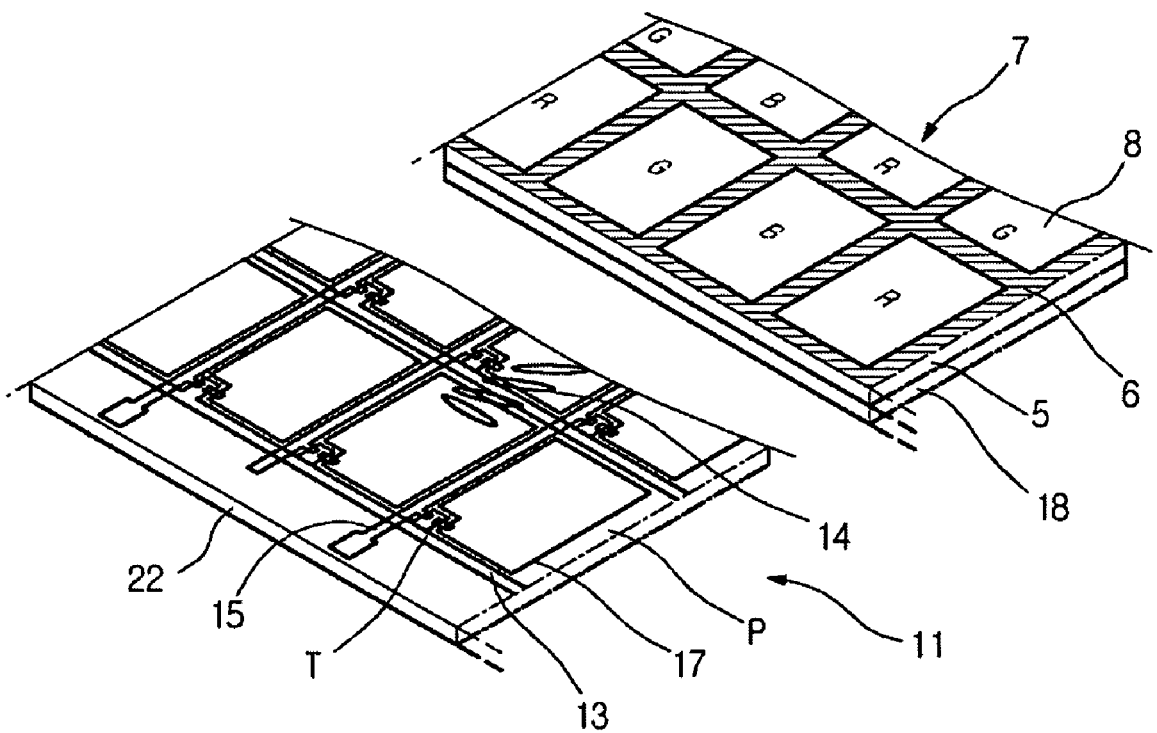
FIG. 1 is an exploded perspective view of a LCD.
Figure 2A:
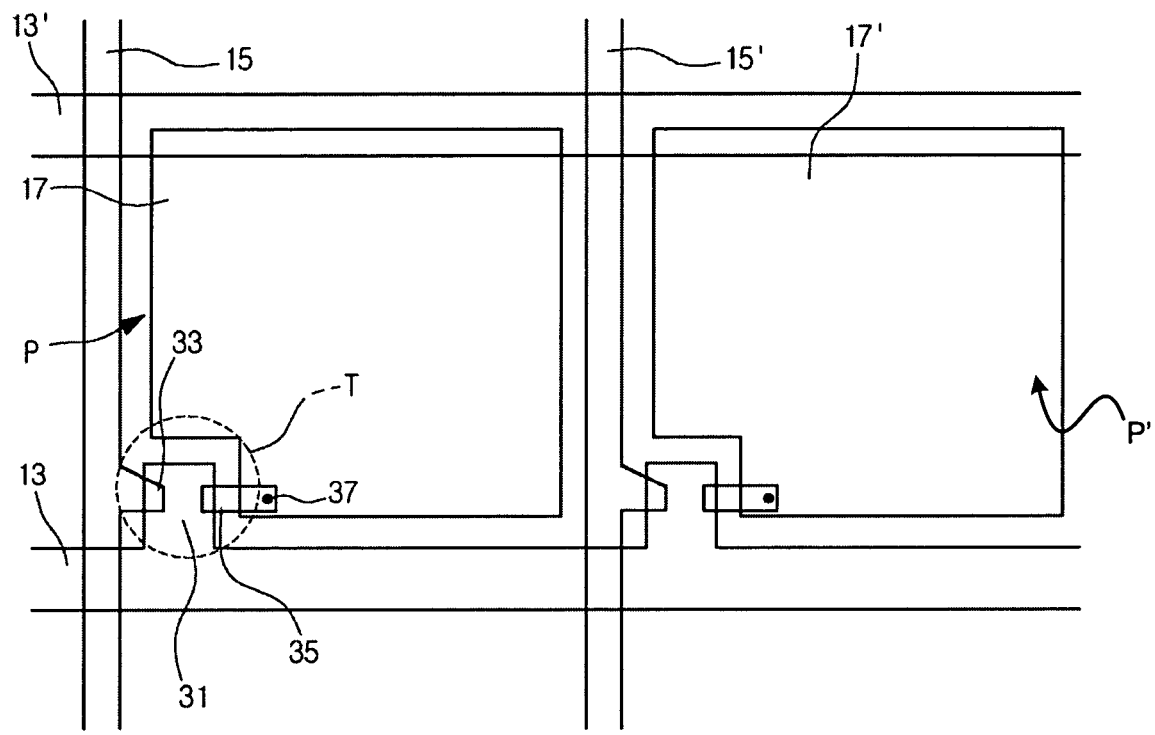
FIGS. 2A, 2B, and 2C are plan views schematically illustrating a partial portion of an array substrate of a LCD.
Figure 2B:
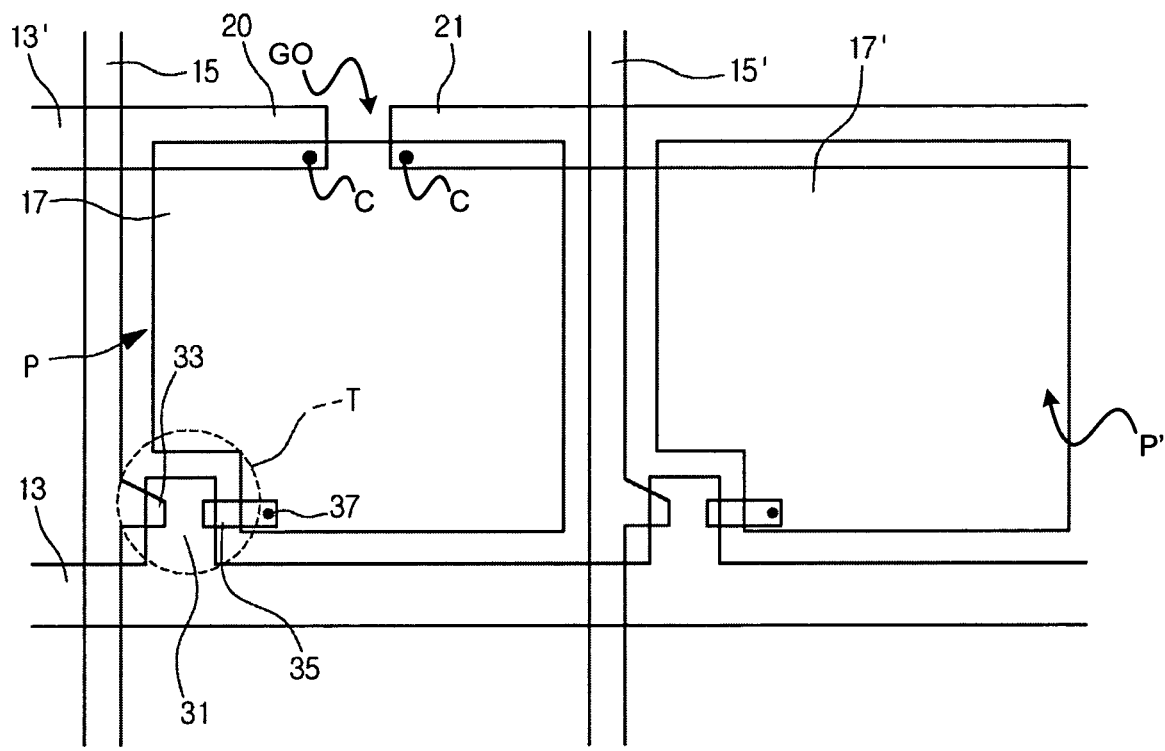
Figure 2C:
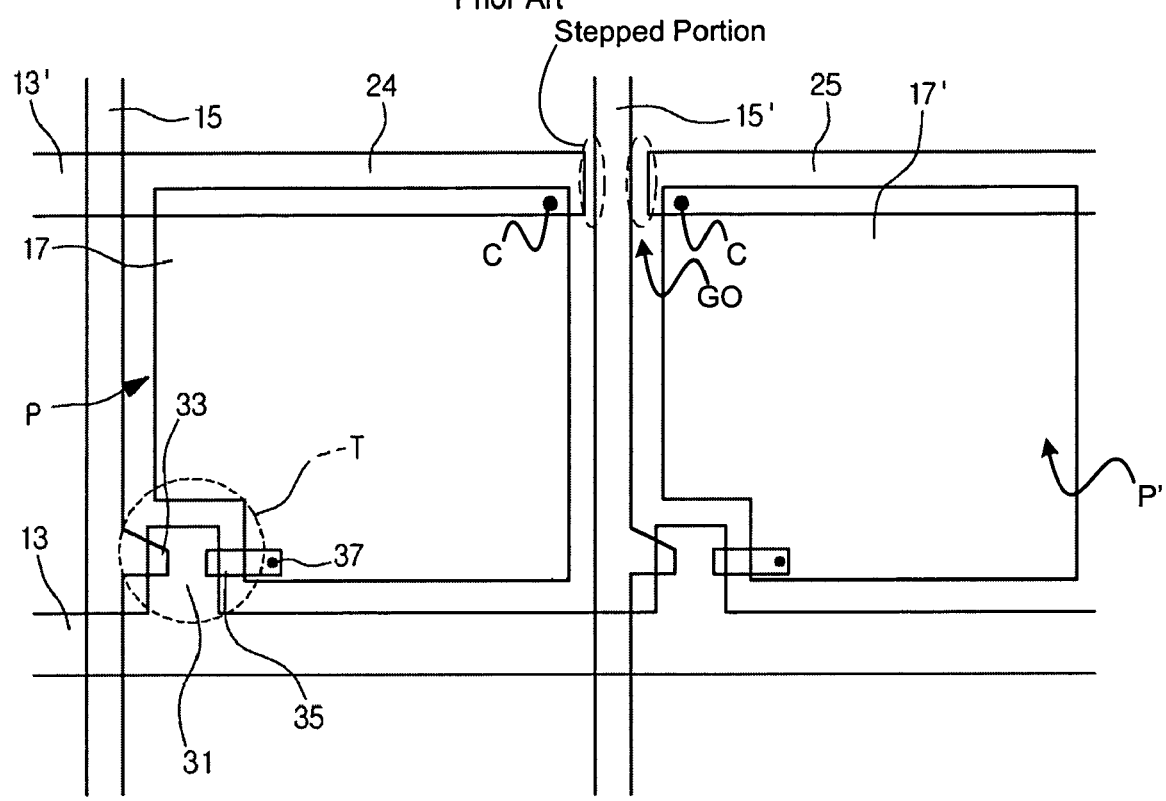

Turning first to FIG. 3, that Figure illustrates a repair method, and a repaired LCD, in which the gate line 13' is opened at a stepped portion that occurs where the gate line 13' intersects the data line 15'. The arrows 302, 304, 306, 308, and 310 denote current flow direction, and the labels "C1" and "C2" denote electrical connection points. Generally, the reference numerals used in FIG. 2C are carried over into FIG. 3.

Figure 6:
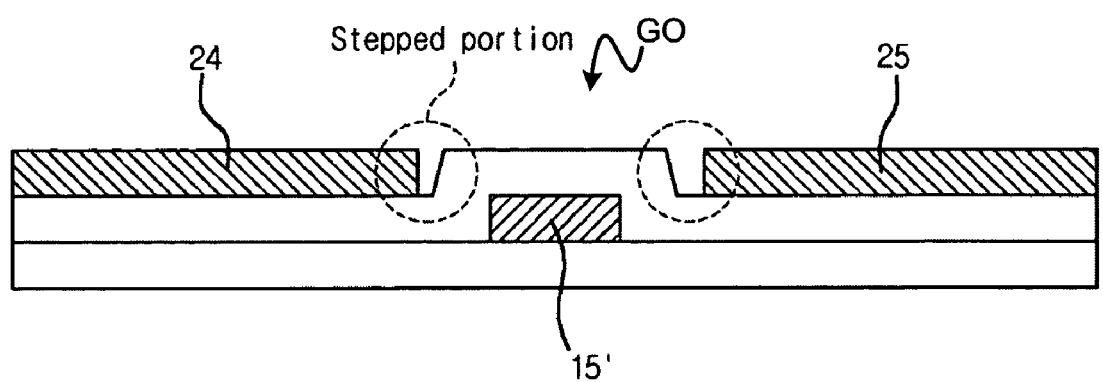
FIG. 6 shows a stepped portion of the LCD where a gate line crosses over a data line.

Turning briefly to FIG. 6, that Figure shows a cross section of the region where the open gate line 13' crosses over the data line 15. As shown in FIG. 6, the open gate line 13' has broken into the first and section portions 24 and 25 at the step the occurs where the open gate line 13' crosses over the data line 15'.

With reference again to FIG. 3, note that the pixel electrodes 17 and 17' overlap the opened gate line 13'. In particular, the electrode 17 overlaps a first portion 24 of the opened gate line 13', while the electrode 17' overlaps a second portion 25 of the opened date line 13'. The electrode 17 is connected to the first portion 24 at the connection point C1, while the electrode 17' is connected to the second portion 25 at the connection point C2.

In other words, when connecting the opened gate line 13' and the pixel electrodes 17 and 17', a laser, for example, may be employed to electrically connect the first portion 24 of the gate line, disposed on a first side of the opened gate line 13', with the overlapping pixel electrode 17. Similarly, the laser may then electrically connect the second portion 25 of the gate line 13', disposed on a second side of the opened gate line 13', with the overlapping pixel electrode 17'.

Here, the first pixel electrode 17 and the second pixel electrode 17' are formed adjacent to each other. The data line 15', that intersects the opened gate line 13', runs between the first and second pixel electrodes 17 and 17'.

Note that in the construction of the LCD, a predetermined portion of the gate line 13' and the pixel electrodes 17 and 17' overlap. They thereby form a storage capacitor with capacitance Cst. Note also that, in the construction of the LCD, an insulating layer is interposed between the gate line 13' and the pixel electrodes 17 and 17' to provide electrical isolation from the gate line 13'. Thus, under ordinary circumstances, the gate line 13' is not electrically connected to the electrodes 17 and 17'.

Continuing with respect to FIG. 3, a metal pattern 26 is formed using, as one example, a laser CVD process, to electrically connect together the adjacent first and second pixel electrodes 17 and 17'.

In other words, using the laser CVD process, the pixel electrodes 17 and 17' are connected to each other by forming the metal pattern 26 between predetermined portions of the first and second pixel electrodes 17 and 17'. In the resulting LCD, the two pixel areas P and P' that include the first and second pixel electrodes 17 and 17' do not play their conventional roles, but instead and look like spots. However, because 2 pixel spots fall within the guidelines that define an acceptable LCD, the LCD, after repair, becomes saleable.

Note also that the data lines 15 and 15' are electrically insulated from the first and second pixel electrodes 17 and 17'. In other words, because the pixel electrodes 17 and 17' are now part of the gate line 13', the data lines 15 and 15' are disconnected from the pixel electrodes 17 and 17'. By doing so, the data line 15 and 15' do not interfere with the signals applied to the gate line 13'.

To this end, as shown in area III of FIG. 3, the drain electrode 35 that is ordinarily electrically connected to the pixel electrode 17 is instead disconnected. Alternatively, for example, the source electrode 33 may be disconnected from the data line 15.

As noted above, the data lines 15 and 15' are disconnected with the pixel electrodes 17 and 17' in order to prevent the signal on the data lines 15 and 15' from influencing the repaired gate line through the pixel electrodes 17 and 17'.

Figure 4A:
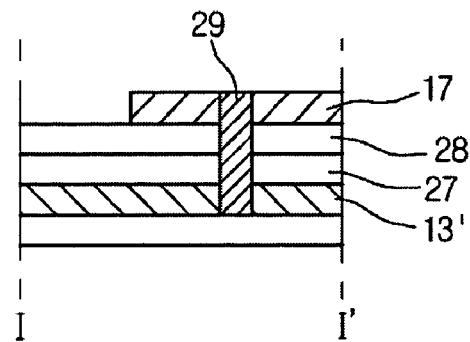
FIGS. 4A and 4B are sectional views taken along the lines I–I' and II–II' of FIG. 3.
Figure 4B:
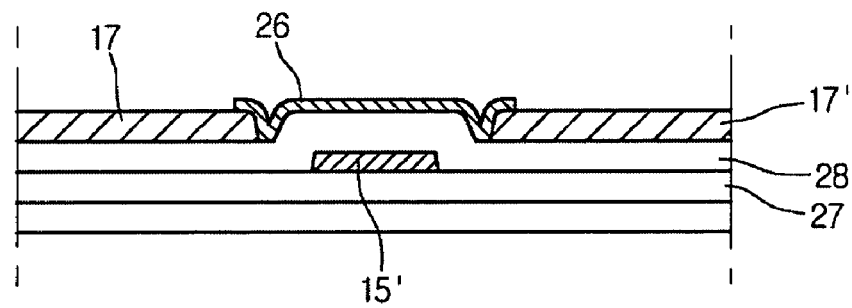

Turning next to FIGS. 4A and 4B, those Figures present sectional views taken along the lines I–I' and II–II' of FIG. 3.

In FIG. 4A, it is shown that the connection 29 electrically connects the opened gate line 13' and the overlapping pixel electrode 17. The connection 29 may be made, for example, by a laser weld formed using laser-Chemical Vapor Deposition (laser-CVD). The repair process may be carried out when a line fail detection proves that the gate line 13' is opened in a process of manufacturing the array substrate of the LCD. The repair process may then be carried out before the process of connecting the color filter substrate on the array substrate and before the process of injecting liquid crystals.

FIG. 4A also illustrates an insulating layer that includes a gate insulting layer 27 and a passivation layer 28. The layers 27 and 28 are interposed between the gate line 13' and the pixel electrode 17. The insulating layer electrically insulates the two metals 13' and 17 from each other before they are electrically connected during the repair process.

In FIG. 4B, it is shown that the first and second pixel electrodes 17 and 17' are electrically connected by forming a metal pattern 26 between predetermined portions of the adjacent first and second pixel electrodes 17 and 17', for example, using a laser CVD.

The metal pattern 26 may be formed when the line fail detection proves that the gate line 13' is open during the process of manufacturing the array substrate of the LCD. The repair process may be carried out before the process of connecting the color filter substrate on the array substrate and before the process of injecting liquid crystals.

Figure 5:
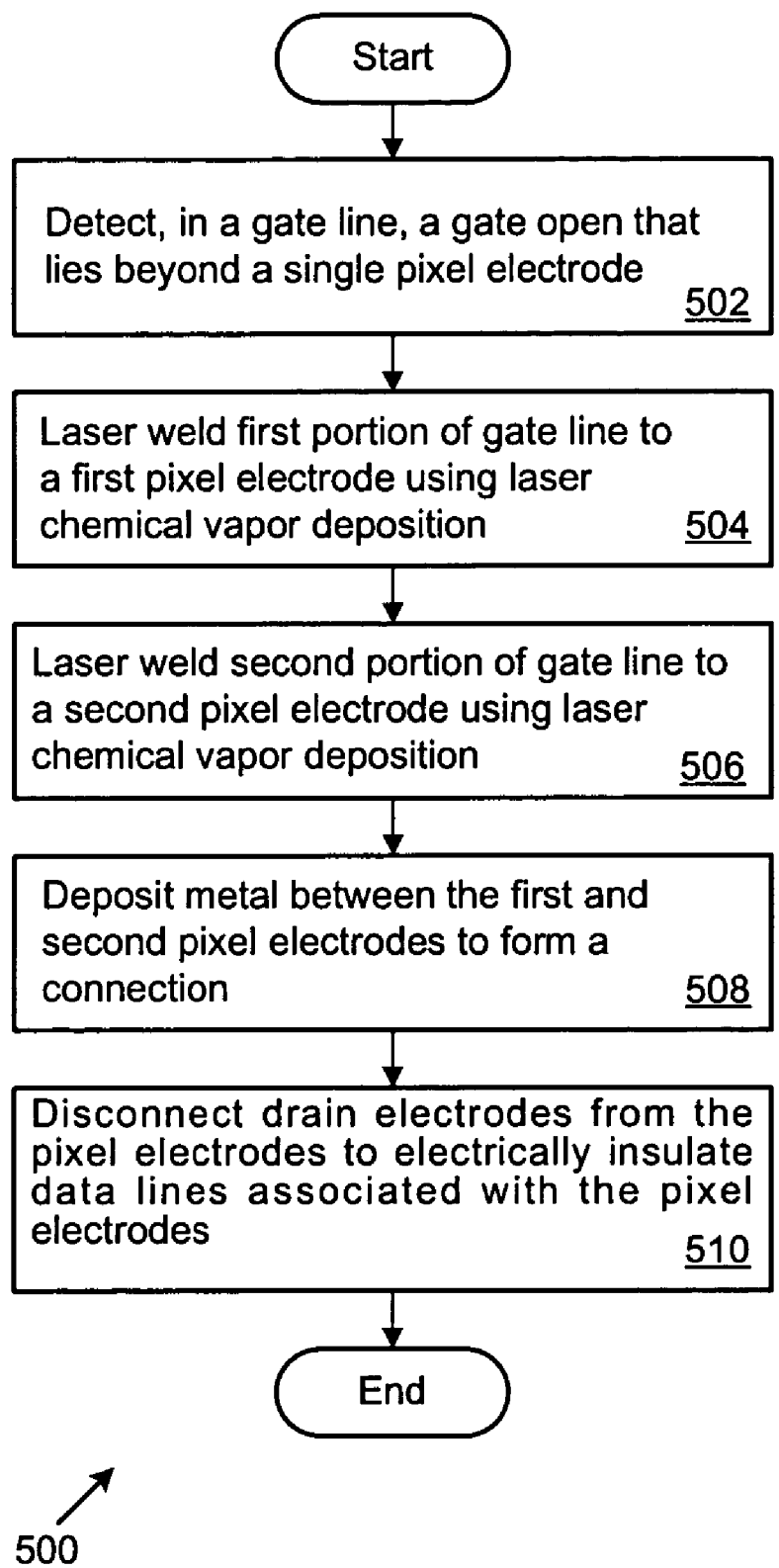
FIG. 5 illustrates a method for repairing an open gate line in an LCD.

With regard next to FIG. 5, that Figure illustrates a method 500 for repairing an open gate line in an LCD.

Initially, the method detects, in a gate line 13', a gate open (GO) using, for example, the line fail detection process noted above (step 502). When the gate open (GO) lies outside a single pixel electrode, the method may then connect (e.g., by laser-CVD) a first side 24 of the gate line 13' to a first pixel electrode 17 (step 504). Similarly, the method may then connect (e.g., by laser-CVD) a second side 25 of the gate line 13' to a second pixel electrode 17' (step 506).

The method also deposits metal 26 between the first and second pixel electrodes 17 and 17' (step 508). The first and second pixel electrodes 17 and 17' are thereby electrically connected and form a bridge across the gate open (GO). Furthermore, the method may disconnect data lines 15 and 15' from the pixel electrodes 17 and 17' (step 510). The data lines 15 and 15' are thereby electrically isolated from the gate line 13' and do not interfere with its operation.

Using the technique explained above, the gate open (GO) in the gate line is repaired so that a current flows in the direction indicated by the arrows 302–310. As a result, the line defect due to the gate open (GO) is overcome, and the resources expended to manufacture the LCD are not wasted, and the manufacturing yield of the LCD may be improved.

It will be apparent to those skilled in the art that various modifications and variations may be made in the techniques described above. Thus, it is intended that the present invention cover such modifications and variations provided that they fall within the scope of the claims and their equivalents.

What is claimed is:

1. A method for repairing an open gate line in an LCD, the LCD including a plurality of gate lines arranged on a substrate, a plurality of data lines that intersect with the gate lines to delineate a plurality of pixel areas, thin film switching transistors disposed proximate to gate line and data line intersections, and pixel electrodes disposed at the pixel areas, the method comprising the steps of:
   when a gate line has a gate open at an intersection with a data line, connecting the gate line with a pixel electrode overlapping a portion of the gate line;
   connecting adjacent first and second pixel electrodes together across the gate open; and
   electrically insulating the pixel electrode connected with the gate line from the data line.

2. The repair method of claim 1, where the portion of the gate line and the pixel electrode overlap to form a storage capacitor, and wherein the gate line and the pixel electrode are electrically insulated by an insulating layer interposed between the gate line and the pixel electrode.

3. The repair method of claim 1, where the gate line includes a first side overlapped with the first pixel electrode and a second side overlapped with a second pixel electrode, and where the step of connecting the gate line comprises the step of laser welding the first side to the first pixel electrode and laser welding the second side to the second pixel electrode.

4. The repair method of claim 3, where the first pixel electrode and the second pixel electrode are adjacent, and where the data line is disposed between the first pixel electrode and the second pixel electrode.

5. The repair method of claim 1, where the step of electrically insulating comprises the step of disconnecting a drain electrode connected to the second pixel electrode.

6. A method for repairing an open gate line in an LCD, the LCD including a plurality of gate lines arranged on a substrate, a plurality of data lines that intersect perpendicular to the gate lines to delineate a plurality of pixel areas, thin film switching transistors disposed proximate to gate line and data line intersections, and pixel electrodes disposed at the pixel areas, the method comprising the steps of:

when a gate line has a gate open at a stepped intersection with a first data line, connecting together a first pixel electrode overlapped with a first predetermined portion of the gate line on a first side of the gate line;

connecting together a second pixel electrode overlapped with a second predetermined portion of the gate line on a second side of the gate line;

connecting the first and second pixel electrodes; and where the data line is associated with the second pixel electrode, and where a second data line is associated with the first pixel electrode, and further comprising the step of electrically insulating the first data line from the second pixel electrode and electrically insulating the second data line from the first pixel electrode.

7. The repair method of claim 6, where the first and second pixel electrodes overlap with the first and second predetermined portions to form storage capacitors.

8. The repair method of claim 6, where the step of connecting the first and second sides of the opened gate line comprises the step of welding the first and second sides.

9. The repair method of claim 6, where the first pixel electrode and the second pixel electrode are adjacent, and where the first date line is disposed between the first pixel electrode and the second pixel electrode.

10. The repair method of claim 6, where step of connecting the first and second pixel electrodes comprises the step of depositing metal between predetermined portions of the first and second pixel electrodes.

11. The repair method of claim 10, where the step of depositing metal comprises the step of depositing the metal by laser chemical vapor deposition.

12. The repair method of claim 6, wherein the step of electrically insulating comprises the step of disconnecting a first drain electrode connected to the first pixel electrode and disconnecting a second drain electrode connected to the second pixel electrode.

13. A method for repairing a signal line with an open in an LCD, the method comprising the steps of:

connecting a first pixel electrode to a first side of the signal line;

connecting a second pixel electrode to a second side of the signal line; and connecting the first pixel electrode to the second pixel electrode to establish a current path across the open;

disconnecting a first data line from the first pixel electrode; and disconnecting a second data line from the second pixel electrode.

14. The method of claim 13, where:

the step of connecting the first pixel electrode comprises the step of connecting a first pixel electrode that overlaps the signal line; and the step of connecting the second pixel electrode comprises the step of connecting a second pixel electrode that overlaps the signal line.

15. The method of claim 13, where:

the step of connecting the first pixel electrode comprises the step of laser connecting; and the step of connecting the second pixel electrode comprises the step of laser connecting.

16. The method of claim 13, where the step of connecting the first electrode to the second pixel electrode comprises the step of connecting adjacent first and second pixel electrodes.

17. The method of claim 13, where the step of connecting the first electrode to the second pixel electrode comprises the step of depositing metal between the first and second pixel electrodes.

18. The method of claim 13, further comprising the steps of:

disconnecting a first transistor drain electrode, associated with a first data line, from the first pixel electrode; and disconnecting a second transistor drain electrode, associated with a second data line, from the second pixel electrode.

* * * * *